United States Patent [19]
Kong

[11] Patent Number: 6,079,230
[45] Date of Patent: Jun. 27, 2000

[54] APPARATUS FOR PREPARING QUARTZ MICROPIPETTES

[76] Inventor: Jian-Qiang Kong, 1378 Bergamont St., Morgantown, W. Va. 26505

[21] Appl. No.: 09/241,867

[22] Filed: Feb. 2, 1999

[51] Int. Cl.⁷ ..................................................... C03B 23/11
[52] U.S. Cl. ............................... 65/160; 65/161; 65/162; 65/269; 65/272; 65/276; 65/279; 65/283; 65/292; 65/DIG. 13
[58] Field of Search ............................. 65/160, 162, 161, 65/159, 158, 244, 269, 272, 276, 279, 283, 292, DIG. 13, 120, 29.11, 29.14, 29.18, 29.12

[56] References Cited

U.S. PATENT DOCUMENTS

| | | |
|---|---|---|
| 2,987,372 | 6/1961 | Olt et al. . |
| 3,498,771 | 3/1970 | Bird et al. . |
| 4,477,273 | 10/1984 | Lynch et al. . |
| 4,530,712 | 7/1985 | Kopf . |
| 4,578,101 | 3/1986 | Clark et al. . |
| 4,600,424 | 7/1986 | Flaming . |
| 4,818,266 | 4/1989 | Sachs et al. . |
| 4,869,745 | 9/1989 | Flaming . |
| 5,017,208 | 5/1991 | Gregory et al. . |
| 5,181,948 | 1/1993 | Belgum . |
| 5,305,224 | 4/1994 | Hishida et al. . |

FOREIGN PATENT DOCUMENTS 3106045  5/1982  Germany .

*Primary Examiner*—Stanley S. Silverman
*Assistant Examiner*—Michael P. Colaianni
*Attorney, Agent, or Firm*—Richard C. Litman

[57] ABSTRACT

The apparatus for preparing quartz micropipettes includes a pair of carriers mounted on a linear ball bearing guide which grasp opposite ends of a quartz glass capillary tube. A pair of miniature torches fueled by a mixture of oxygen and propane simultaneously heat a portion of the center of the capillary tube and an inverted U-shaped bar disposed between the torches in propinquity to the capillary tube. A cable having one end attached to one of the carriers and the other end attached to the core of a solenoid, the intermediate portion of the cable being wound around a pulley and attached to the second carrier, is used to pull the capillary tube in opposite directions as the tube softens. The cable is also wound around the axle of an optical encoder assembly which sends an electrical signal to a computer based upon either the distance or velocity at which the tubing is pulled apart. When the distance or velocity reaches a predetermined limit, the torches are shut off and the solenoid activated to separate the capillary tube into two symmetrically formed micropipettes, the U-shaped bar providing sufficient residual heat to ensure symmetry.

11 Claims, 2 Drawing Sheets

APPARATUS FOR PREPARING QUARTZ MICROPIPETTES

BACKGROUND OF THE INVENTION

1. Field of the Invention

The present invention relates to apparatus for drawing glass tubing, and particularly to an apparatus for preparing micropipettes from quartz tubing.

2. Description of the Related Art

Micropipettes are a commonly used item of glassware in the biology laboratory. Sharp micropipettes are used to record electrical activity inside the cell. Injection micropipettes are used to transfer materials into and out of the cell through the cell membrane. Blunt patch pipettes are used to record electrical activity within a patch of the cell membrane or to record the electrical activity of the entire cell. Micropipettes are commonly made from borosilicate or aluminosilicate glass due to their low cost and comparatively easier fabrication. Quartz or fused silicate glass is harder and tougher than borosilicate or aluminosilicate glass. It is very desirable to have micropipettes made from quartz for certain applications, such as impaling cells underneath a deep tissue or wrapped by a layer of tough connective tissue; injections requiring a large diameter and relatively strong tip; and for low noise single ion channel recording because of the low electronic noise characteristic of the quartz glass.

There are, however, several problems encountered in drawing quartz glass for the preparation of micropipettes. Conventional glass pullers use electrically heated filaments of platinum or chromium, which are not effective in pulling quartz glass at the 1600° C. temperature at which quartz softens. Tungsten, molybdenum or graphite filaments can withstand the high temperature, but require an inert gas environment to prevent oxidation of the filaments. Electric arc and several types of gas flames can melt quartz capillary tubes, but it is not as easy to control the intensity of the heat. Laser beams overcome many of these disadvantages. However, laser beam radiation heats the tubing from the inside out, so that when the quartz tubing is pulled, the ratio of the outside diameter to the inside diameter of the tubing diminishes, with the inside thinning more rapidly than the outside, being most pronounced at the tip of the micropipette and with multicycle pulling.

The present invention resolves the problems of the prior art by providing an apparatus for preparing quartz micropipettes utilizing a micropipette puller with heat supplied by miniature torches fueled by a propane-oxygen mixture with a sensor under computer control to determine when the quartz has softened sufficiently, automatically shutting down the heat source and pulling the tubing to produce symmetrical micropipettes with tips having an outside diameter to inside diameter ratio substantially close to the corresponding ratio of the original capillary tubing.

U.S. Pat. No. 4,530,712, issued Jul. 23, 1985 to J. D. Kopf, describes an apparatus for drawing micropipettes less than ten microns in diameter having a fixed clamp and a slidable clamp which moves vertically downward by gravity to stretch glass tubing softened by heat provided by a platinum filament, and an optical switch to shut off power to the heater when the tubing has been stretched the desired distance. U.S. Pat. No. 4,818,266, issued Apr. 4, 1989 to Sachs, et al., teaches an apparatus and method for pulling glass tubing using a stationary head stock and moveable tailstock, the stocks having the chuck and collet of a motor mounted in journals in the stock, the collets grasping opposite ends of glass tubing. The tubing is heated electrically while the motors rotate the tubing in the same direction and at the same speed, the tailstock being pulled when the glass softens while the heating element is simultaneously moved one-half the distance the tailstock is moved in order to maintain uniform heating.

U.S. Pat. No. 4,600,424, issued Jul. 15, 1986 to D. G. Flaming, shows a method of making ultrafine micropipettes using heat applied to a length of capillary tubing with the weight of a solenoid plunger suspended from one end of the tubing and a velocity monitor in the length of cable between the end of the tubing and the solenoid plunger. The heating is stopped and the tubing cooled with nitrogen when the velocity reaches a predetermined speed. U.S. Pat. No. 4,869,745, issued Sep. 26, 1989, also to D. G. Flaming, describes a micropipette puller having jaws at the end of puller bars grasping opposite ends of a length of capillary tubing. The puller bars roll along roller bearings and are pulled by cables routed over pulleys and pulled slightly by the weight of a solenoid and more strongly by the plunger of the solenoid under computer control when the tubing is sufficiently softened. Heat is applied to the middle of the tubing by a laser beam redirected either by reflection in a mirror or refraction through a prism, the mirror or prism being oscillated by a stepper motor to heat the tube uniformly.

U.S. Pat. No. 5,181,948, issued Jan. 26, 1993 to J. H. Belgum, discloses essentially the same device as the second Flaming patent, but the size of the laser beam is controlled by directing the beam through an aperture with adjustable shutters, or through an aperture of fixed size which is removable and replaceable by smaller or larger size apertures.

German Patent 3,106,045, published May 6, 1982, shows a method and apparatus for the production of small capillary tubes from glass or quartz, including an electric motor which rotates glass tubing, heating the tubing in the middle and pulling the tubing apart as it softens by means of permanent magnets arranged with their poles repelling each other, one of the magnets being mounted on a leaf spring which pulls a shaft connected to one end of the tubing. U.S. Pat. No. 2,987,372, issued Jun. 6, 1961 to Olt, et al., describes a method of making spools of microtubing from a wider diameter quartz tubing which utilizes oxygen and a propane torch to heat the tubing.

None of the above inventions and patents, taken either singularly or in combination, is seen to describe the instant invention as claimed. Thus an apparatus for preparing quartz micropipettes solving the aforementioned problems is desired.

SUMMARY OF THE INVENTION

The apparatus for preparing quartz micropipettes includes a pair of carriers mounted on a linear ball bearing guide which grasp opposite ends of a quartz glass capillary tube. A pair of miniature torches fueled by a mixture of oxygen and propane simultaneously heat a portion of the center of the capillary tube and an inverted U-shaped bar disposed between the torches in propinquity to the capillary tube. A cable having one end attached to one of the carriers and the other end attached to the core of a solenoid, the intermediate portion of the cable being wound around a pulley and attached to the second carrier, is used to pull the capillary tube in opposite directions as the tube softens. The cable is also wound around the axle of an optical encoder assembly which sends an electrical signal to a computer based upon either the distance or velocity at which the tubing is pulled apart. When the distance or velocity reaches a predetermined limit, the torches are shut off and the solenoid activated to separate the capillary tube into two symmetrically formed micropipettes, the U-shaped bar providing sufficient residual heat to ensure symmetry.

Accordingly, it is a principal object of the invention to provide an apparatus to prepare quartz micropipettes from capillary tubing in which the ratio of the outside diameter to inside diameter of the pipette tip is approximately the same as the corresponding ratio of the original tubing.

It is another object of the invention to provide an apparatus to prepare quartz micropipettes which ensures symmetry in a pair of micropipettes pulled from a single piece of capillary tubing by providing means for retaining heat in the heating zone during separation of the tubing.

It is a further object of the invention to provide an apparatus for preparing quartz micropipettes which provides different modes of sensing when the capillary tube has been sufficiently softened for pulling in order to provide different shapes of tubing, such as a long, slim shank, a short, blunt tip, etc.

Still another object of the invention is to provide an apparatus for preparing quartz micropipettes which uses an economical mixture of oxygen and propane gas to heat the capillary tubing.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
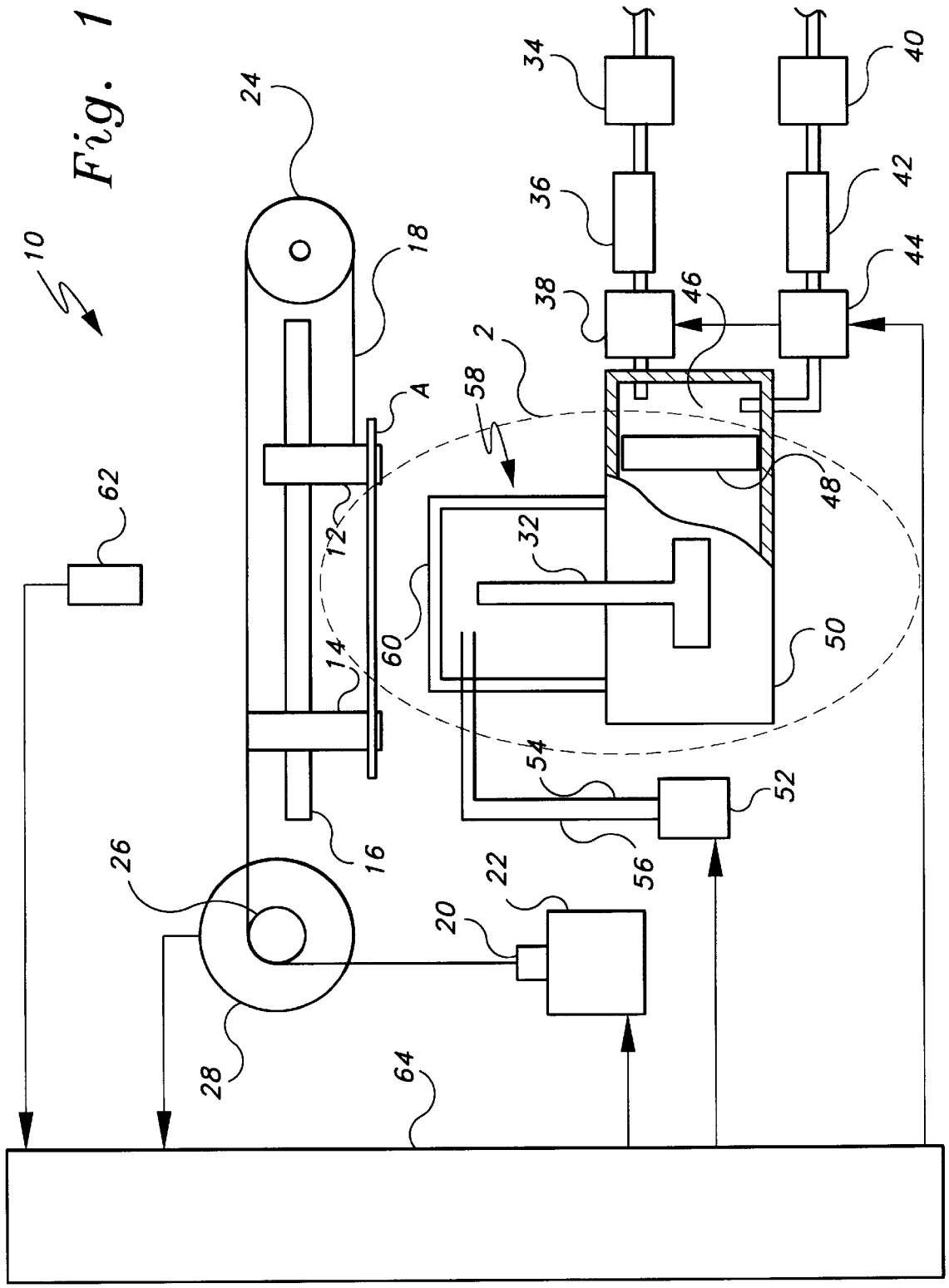
FIG. 1 is a partially diagrammatic front view of an apparatus for preparing quartz micropipettes according to the present invention.
Figure 3:
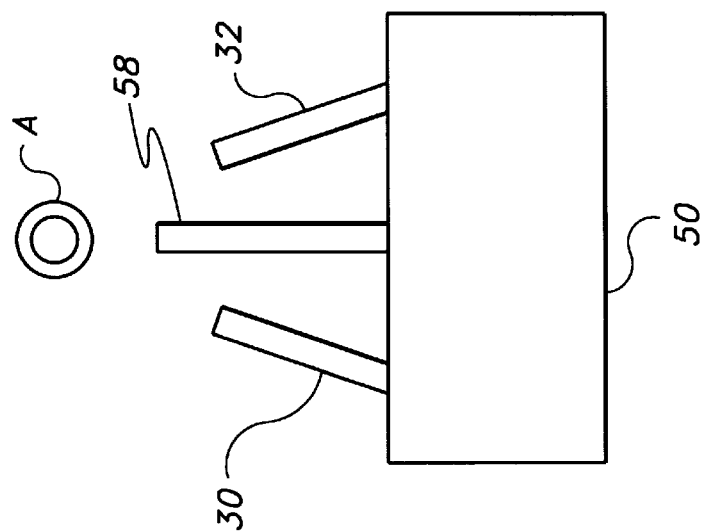
FIG. 3 is a side view of the detail view of FIG. 2.
Figure 2:
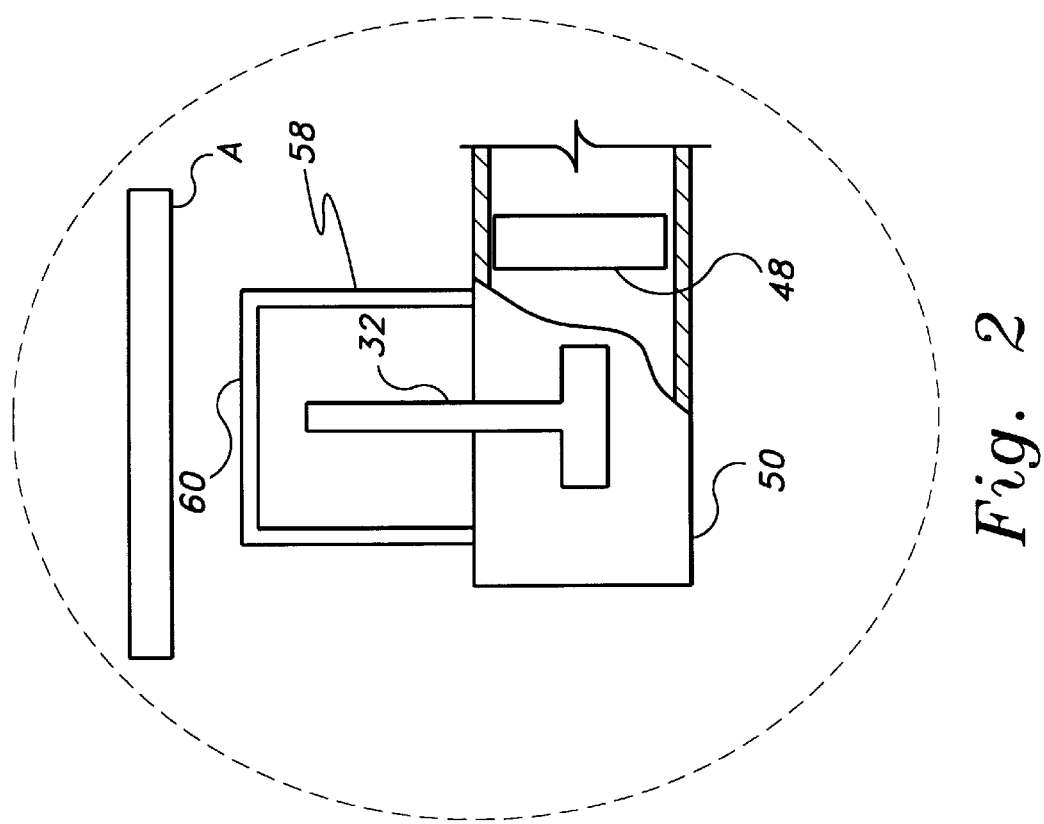
FIG. 2 is a detail view of the area 2 in FIG. 1 showing the relative positioning of the torches and the capillary tubing.

The present invention is an apparatus for preparing quartz micropipettes, designated generally as 10 in FIG. 1, the apparatus 10 and details shown diagrammatically and not to scale in FIGS. 1 through 3. A quartz capillary tube A is clamped between a pair of carriers 12, 14 slidably mounted on a rectilinear ball bearing guide 16. One end of cable 18 is attached to one 12 of the carriers, and the other end of the cable 18 is attached to the plunger 20 of a solenoid 22. The intermediate portion of the cable 18 is wound around pulley 24 and attached to the second carrier 14, the length of the cable 18 between carrier 12 and pulley wheel 24 being parallel to the length of the cable 18 between pulley wheel 24 and second carrier 14, so that as cable 18 is pulled, the carriers 12, 14 are drawn in opposite directions on the ball bearing guide 16, thereby pulling the ends of the capillary tubing A in opposite directions.

The length of the cable 18 between second carrier 14 and plunger 20 is wound around the axle 26 of an optical encoder assembly 28, the plunger 20 being suspended from the axle 26 so that with no current applied to the solenoid 22, the weight of the plunger exerts a tension on the cable 18 by the force of gravity. In practice, the cable 18 may be wound around a pulley wheel integral with the axle 26, the axle 26 being rotatably mounted by any means conventional in the art, such as by roller bearings mounted in a pedestal (not shown), so that when the cable is pulled, friction between the cable 18 and the axle 26 causes the axle 26 to rotate through an angular arc proportional to the distance the cable 18 moves.

The capillary tubing A is heated by a flame produced by a pair of miniature torches 30, 32 mounted below a section of the tubing A, as shown in FIGS. 1, 2, and 3. The torches 30, 32 are supplied by propane gas through a precision regulator 34, a restriction orifice 36 and a control valve 38. Similarly, the torches 30, 32 are supplied with oxygen gas through a precision regulator 40, a restriction orifice 42, and a control valve 44. The propane and oxygen gases are mixed in a mixing chamber 46 defined in a torch base 50 and flow to the torches 30, 32 through a backfire stopper 48. The backfire stopper 48 is a piece of micropore brass disk that stops flame from backdrafting from the torches 30, 32 to the mixing chamber 46. The torches 30, 32 are ignited by an electrically controlled igniter 52 having positive 54 and negative 56 electrodes separated by a spark gap near the torch 30, 32 nozzles.

The nozzles of the miniature torches 30, 32 are made from quartz tubing having a 1 mm outside diameter and 0.5 mm inside diameter. As shown in FIGS. 2 and 3, the torch nozzles 30, 32 are mounted vertically in the torch base 50 on opposite sides of a vertical plane in which the tubing A is disposed, the vertical plane substantially bisecting the distance between the nozzles 30, 32 on the torch base 50, and are directed at an angle, preferably about 75° towards the tubing. The torch flame is an oxidative flame, i.e., more oxygen is supplied than stoichiometrically required for complete oxidation of the propane in the mixture. Preferably, the oxygen regulator 40 is maintained at a constant pressure, the amount of heat delivered being controlled by varying the propane regulator 34. The size of the flame may be adjusted from a length of about 20 mm to about 1 mm. The flame may be adjusted to heat a section of the capillary tube between about 1–4 mm. Hence, the torches produce a precision flame particularly well suited to drawing micropipettes from small diameter capillary tubing.

The restriction orifices 36, 42 increase the precision of the gas flow control. The control valves 38, 44 are normally closed electromagnetic valves operated under computer control as described below. An inverted U-shaped bar 58 is disposed between the nozzles of the torches 30, 32, the ends of the U being attached to the torch base 50 and the base 60 of the U being elevated to a superior position. The U-shaped bar may be made from a quartz rod having a size and cross sectional diameter to retain sufficient heat after the flame is extinguished to maintain the quartz tubing A in a softened condition during separation of the tubing A. The U-shaped bar 58 is disposed with the base 60 of the U close to the tubing A so that the bar 58 is heated by the flame from the torches 30, 32. The base 60 of the U is aligned generally parallel to and immediately below the tubing A. The U-shaped bar 58 prevents direct flame heating on the bottom of the tubing A, provides a residual heat when the torches 30, 32 are shut down, and maintains a uniform heating longitudinally and on both sides of a section of the tubing A. The residual heat supplied by the U-shaped bar 58 is important in forming symmetric micropipette tips. Without the bar 58, the capillary tubing A usually breaks into two uneven micropipette tips, with one side longer than the other. The U-shaped quartz bar 58 will not deform in the heating operation because no substantial tension is applied to it.

The apparatus 10 includes a photosensor 62 which monitors the flame produced by the miniature torches 30, 32. When the photosensor 62 senses that the flame is extinguished, either accidentally or intentionally, the sensor 62 sends an electronic signal to a computer control system 64, which is electrically connected to control valves 38 and 44, and shuts the valves 38, 44 to stop the flow of gas to the mixing chamber 46. The computer control system is also electrically connected to the optical encoder assembly 28, the igniter 52, and the solenoid 22 for the purposes described below.

In operation, a section of capillary tubing A is clamped between the carriers 12, 14. The coil of the solenoid 22 is not energized, so that there is only the tension supplied by the weight of the plunger 20 applied to opposite ends of the tubing A. The computer control system 64 is manually instructed to start a pulling program by opening the control valves 38, 40 to supply propane and oxygen to the mixing chamber 46 at the pressures set by the regulators 34, 40, and to activate the igniter 52, igniting the torch 30, 32 by sparks jumping the gap between the electrodes 54, 56. When the sensor 62 detects a flame, the computer 64 receives a signal to deactivate the igniter 52. The size of the flame is controlled, preferably by adjusting the supply of propane at the regulator 34. As the heat of the flame softens the capillary tubing A, the weight of the plunger 20 pulls the cable 18, causing the carriers 12, 14 to separate and pull the ends of the tubing A in opposite directions. Friction between the cable 18 and the axle 26 causes the axle 26 to rotate. The optical encoder assembly 28 measures the distance the tubing A is stretched as it softens and sends an appropriate number of electronic pulses to the computer 64 proportional to the distance. The computer control 64 may be programmed to interpret the signals from the optical encoder as distance by the absolute number of pulses, or as velocity or frequency by the number of rotations or fractions of rotation per unit of time. When a predetermined distance or velocity (frequency) is reached, the computer control closes the valves 38, 44 to extinguish the flame. The coil of the solenoid 22 is activated at a timed interval to sharply pull the plunger 20 into the core of the solenoid 22, separating the ends of the capillary tubing A into two symmetric micropipette tips, the tubing being supplied with residual heat by the inverted U-shaped bar 58 during the separation.

The apparatus may be used to prepare micropipettes having a tip diameter between about 0.3 microns to ten microns. The computer control 64 is operated indifferent modes, depending upon the type of pipette desired. It has been found that the distance mode is better when a long, slim shank is desired. The velocity or frequency mode is better for forming a conventional intracellular pipette. For short, blunt tip, patch clamp pipettes, a multi-cycle mode with alternate period of pulling and cooling using the distance mode produces the desired tip. For multi-cycle pulling, the apparatus may also be operated in combined mode, with distance and velocity modes being applied sequentially.

It is to be understood that the present invention is not limited to the embodiments described above, but encompasses any and all embodiments within the scope of the following claims.

I claim:

1. An apparatus for preparing quartz micropipettes by pulling opposite ends of a length of capillary tubing made from quartz or fused silicate glass, comprising:
    a) a pulling means for pulling opposite ends of a length of capillary tubing;
    b) a heating means for heating a section of capillary tubing, said heating means including a pair of miniature torches adapted for being fueled by a flammable gas, the torches being mounted vertically on a torch base on opposite sides of a vertical plane bisecting the distance between the torches measured on the torch base;
    c) a spark generating means for generating a spark between said torches in order to ignite a flammable gas;
    d) an optical encoder assembly having an axle, said optical encoder assembly being connected to said pulling means for converting a distance the capillary tubing is pulled into electrical pulses proportional to the distance; and
    e) a computer control, said optical encoder, said spark generating means, said heating means, and said pulling means being connected to the computer control, the computer control being programmed to switch said heating means to an off position and to pull the tubing apart in order to form two symmetric micropipettes when the electrical pulses from the optical encoder assembly reach a predetermined level.

2. The apparatus for preparing quartz micropipettes according to claim 1, wherein said each of said miniature torches further comprise a nozzle made from quartz glass tubing, the nozzles being mounted on the torch base and being angled towards the vertical plane bisecting the distance between the nozzles measured on the torch base.

3. The apparatus for preparing quartz micropipettes according to claim 2, wherein said heating means further comprises an inverted U-shaped bar mounted on said torch base between said miniature torches, the base of the U being aligned with a vertical plane bisecting the distance between said miniature torches measured on the torch base, the base of the U-shaped bar being disposed in close proximity to the free ends of the nozzles in order to absorb heat when said torches are ignited.

4. The apparatus for preparing quartz micropipettes according to claim 2, wherein said each of said nozzles is made from quartz glass tubing having an outside diameter measuring about one millimeter and an inside diameter measuring about 0.5 millimeter.

5. The apparatus for preparing quartz micropipettes according to claim 1, wherein said heating means further comprises:
    a) a first gas supply line adapted for supplying oxygen gas to said miniature torches, the supply line including a precision regulator, a restriction orifice, and a control valve, the control valve being an electromagnetic valve electrically connected to said computer control;
    b) a second gas supply line adapted for supplying propane gas to said miniature torches, the supply line including a precision regulator, a restriction orifice, and a control valve, the control valve being an electromagnetic valve electrically connected to said computer control;
    c) a mixing chamber defined within said torch base, said first and second gas supply lines being connected to said mixing chamber; and
    d) a backfire stopper disposed between said mixing chamber and said miniatures torches, the backfire stopper for preventing flame from backdrafting into said mixing chamber.

6. The apparatus for preparing quartz micropipettes according to claim 1, wherein said spark generating means comprises:
    a) an igniter;
    b) a positive electrode electrically connected to said igniter; and c) a negative electrode electrically connected to said igniter;

wherein said electrodes are separated by a gap, a spark being generated in the gap when current is applied, said electrodes being disposed near said torches so that the inflammable gas may be ignited by the spark.

7. The apparatus for preparing quartz micropipettes according to claim 1, wherein said pulling means comprises:

a) a first carrier;

b) a second carrier, said first and second carriers being adapted for clamping a length of capillary glass tubing;

c) a rectilinear guide, said first and second carriers being slidably mounted on said guide;

d) a solenoid having a plunger and a core, the plunger being moveable within the core;

e) a pulley wheel; and f) a cable having a first end and a second end;

wherein the first end of said cable is attached to said first carrier and the second end of said cable is attached to the plunger of said solenoid, said cable being wound around said pulley wheel, attached to said second carrier, and wound around the axle of said optical encoder, said plunger being suspended from the axle of said optical encoder so that said cable is maintained in tension, said first and second carriers being pulled in opposite directions.

8. The apparatus for preparing quartz micropipettes according to claim 7, wherein said computer control is programmed to energize said solenoid when the electrical pulses sent by said optical encoder assembly reach a predetermined level, so that the plunger is drawn into the core of said solenoid, exerting a sharp pulling force in order to pull said first and second carriers in opposite directions, whereby the capillary tubing is separated into two micropipette tips.

9. The apparatus for preparing quartz micropipettes according to claim 1, wherein said computer control has a distance mode, said computer being programmed to count the number of electrical pulses sent by said optical encoder assembly, the number of electrical pulses being proportional to the distance said pulling means pulls the opposite ends of the length of capillary tubing, said computer being programmed to switch said heating means to an off position and to pull the tubing apart in order to form two symmetric micropipettes when the electrical pulses from the optical encoder assembly reach a predetermined level.

10. The apparatus for preparing quartz micropipettes according to claim 1, wherein said computer control has a frequency mode, said computer being programmed to count the number of electrical pulses sent by said optical encoder assembly per unit of time, the number of electrical pulses per unit of time being proportional to the rate at which said pulling means pulls the opposite ends of the length of capillary tubing, said computer being programmed to switch said heating means to an off position and to pull the tubing apart in order to form two symmetric micropipettes when the electrical pulses from the optical encoder assembly reach a predetermined level.

11. The apparatus for preparing quartz micropipettes according to claim 1, further comprising a photosensor, said photosensor being connected to said computer control, said photosensor sending an electrical signal to said computer control when the flame from said torches is extinguished, so that said computer may shut off the supply of flammable gas to said heating means.

* * * * *